Patented Aug. 30, 1949

2,480,104

UNITED STATES PATENT OFFICE 2,480,104

CHEMOTHERAPEUTIC PREPARATION

Oliver Herdien Peterson, Charles City, Iowa, assignor to Dr. Salsbury's Laboratories, a corporation of Iowa No Drawing. Application March 25, 1948,
Serial No. 17,121

12 Claims. (Cl. 167—51.5)

This invention pertains to the chemotherapeutic control of infections of the gastro-intestinal tract which are due to closely related bacteria of the colon-typhoid-dysentery group. More specifically, the invention deals with chemotherapeutics adapted for use in the control of Enterobacteriaceae. The organisms of this family are Gram-negative straight rods which may be motile with peritrichous flagella, or may be non-motile. Their antigenic composition is best described as a mosaic which results in serological interrelationship among their several genera, even extending to families other than Enterobacteriaceae. This family includes many animal- and plant-parasites, the latter causing blight and soft rot. Other organisms of this family frequently occur as saprophytes which cause decomposition of plant material containing carbohydrates. All the species of the family Enterobacteriaceae grow well on artificial media and attack carbohydrates with the production of acid or acid and visible gas.

The family of Enterobacteriaceae includes five tribes; namely, the Eschericheae; the Erwineae, comprising many plant parasites; the chromogenic Serrateae producing a pink-red or orange-red pigment; the Proteae, and the Salmonelleae.

Salmonelleae live in the bodies of warm blooded animals, including man, and occasionally in reptiles. The organisms are frequently present in the food and water consumed by their hosts. They comprise two genera—the Salmonella and the Shigella. All of the known species of Salmonella are pathogenic for warm blooded animals and give rise to food infections and enteric fever and in animals are the causative agents of several diseases. Some or all of them may also live in decomposing foods. The genus Shigella contains various causative agents of human dysentery. The organisms are frequently spread by polluted water and by flies.

Many of the members of the Enterobacteriaceae are of importance to the field of veterinary medicine and investigators have implicated these organisms in the following diseases: calf scours; mouse typhoid; necrotic enteritis of hogs; enteritis of guinea pigs; megrims of pigeons; teel disease of ducklings; abortion in horses, sheep and cattle; as a secondary invader in the virus disease, hog cholera; cattle septicemia; paratyphoid infections of turkeys and chickens; fowl typhoid; and pullorum disease, and others.

Pullorum disease is a world-wide problem in poultry husbandry and causes economic losses of serious proportions. Mortality in young chicks is severe and may be as high at 85 per cent. In the infected chicks which survive, there is generally found impairment of growth, fertility, and hatchability as a result of the infection. Many of the surviving birds become permanent carriers. Salmonella pullorum may affect the ovaries of adult birds and in this way transmit the disease through the egg to the young. The cycle of infection begins with the hatching of infected eggs which were laid by diseased hens. Many of the infected embryos die prior to hatching. Those which are infected upon hatching frequently die in the first three or four weeks of life. A great number of the survivors remain infected throughout life and transmit the disease to progeny and contacts. The disease is also spread from chick to chick and from adult birds to the baby chick through contaminated food, water, litter, etc., through incubator and brooder transmission. It is spread upon the farm through contaminated soil. The disease may be transmitted by wild fowl and birds.

A wide variety of drugs has been suggested for combating Enterobacteriaceae infections and in particular those of the above-described types, and sulfanilamide and its derivatives have been used extensively in recent years. However, many of these compounds are of limited value because of their relative toxicity and low efficacy against Gram-negative organisms. In order to obtain optimum activity it is necessary to administer large initial doses. In the fowl, for instance, high doses are frequently unpalatable. Birds do not show normal weight gains. Other evidences of toxicity may be manifested.

In view of these shortcomings, extensive investigations have been conducted for the purpose of finding new sulfa compounds of lesser toxicity and greater efficacy, particularly in the initial stage of medication. Although some of the newer sulfanilamide derivatives have shown a comparatively superior value over the old compounds, they still are far from providing a safe and dependable medication in Enterobacteriaceae infections.

It is therefore one object of the present invention to provide a new chemotherapeutic preparation which is particularly adapted for the control and treatment of infections caused by Enterobacteriaceae.

It is another object of the invention to provide a therapeutic preparation which is an effective medication against Salmonella infections.

Still another object of the invention is the provision of a drug that will effectively control pullorum disease in chicks without manifesting toxic effects on the so-treated birds.

It is also an object of the present invention to provide a chemotherapeutic medication by which it is possible to reduce the ordinarily curative dosage of sulfa drugs without diminishing their potency in the treatment of Salmonella infections and especially of pullorum disease.

Other objects and advantages and features of the invention will become apparent from the following disclosure which is primarily intended to be illustrative, but not limiting in scope.

I have discovered that it is possible to enhance considerably the therapeutic effect of the sulfanilamide drugs if these substances are administered in conjunction with 4-4'-diamino-diphenylsulfone

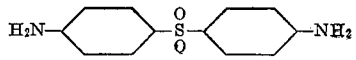

and its closely related homologues, and it is believed that this function is predicated upon the synergistic action between the sulfa compound and these sulfones. The combined medication of these two types of substances not only materially increases the efficacy of the sulfa therapy in general, but also permits a successful treatment with considerably lower doses of sulfanilamides than ever before thought to be possible, thereby considerably reducing the danger of toxic reactions generally attendant upon sulfa therapy.

Equivalent in therapeutic effect to the 4-4'-diamino-diphenylsulfone are primarily those derivatives in which either one or both of the amino radicals are substituted by groups easily convertible to free NH$_2$. Thus the amino radical may be replaced by NO$_2$, or —N=N—. Likewise the NH$_2$ group may be acylated or its hydrogen may be replaced by alkyl, aryl, or aralkyl substituents. The applicable concentration range of these derivatives and homologues, however, has been found to differ to a certain degree from that of the 4-4'-diamino-diphenylsulfone. In order to obtain equal synergistic potency it may in some cases be necessary to alter the ratio of the compound involved in proportion to the sulfa drug. If in some instances toxicity is observed, the dosage of the total medication should be lowered and treatment correspondingly prolonged. It may also be necessary to increase the drug intake in cases where low efficacy is observed. Such variations and modifications, however, may be experimentally determined without great difficulty by every skilled worker and do not depart from the spirit and scope of the present invention.

The sulfa compounds contemplated within the purview of my invention are characterized by the general structural formula

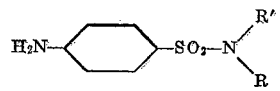

wherein R' is H or a metal, and R is a member of the group consisting of alkyl, aryl, aralkyl, pyridyl, pyrimidyl, thiazolyl, thiazoline, pyrazol, and their derivatives. Compounds of particular interest among this group are N'-phenylsulfanilamide, N'-benzoylsulfanilamide, sulfadiazine, sulfamerazine, sulfamethazine, sulfanilamide, sulfathiazole, sulfapyridine and sulfapyrazine. These examples, however, are only illustrative of the broader field of sulfanilamide derivatives which will exhibit the synergetic effect in conjunction with 4-4'-diamino-diphenylsulfone and its homologues in view of the general accepted fact that the

group, common to most of the sulfa drugs, is the structural element in which the chemotherapeutic function is anchored.

The new combination according to my invention has been extensively and successfully tested on *Salmonella pullorum* in young chicks. However, it is understood that these tests conducted on one species of Enterobacteriaceae are given by way of illustration only and are not to be construed as limitative to the scope of the invention. In effect it will be apparent to those skilled in the art that in view of the close biochemical, antigenic, and symptomatic relationship between the numerous members of the family Enterobacteriaceae and their recognized responsiveness to sulfa drugs a similar synergistic action will take place in combination with diamino-diphenylsulfone when the broad principle of the present discovery is applied to other Enterobacteriaceae infections. The best mode of administration in every such instance will depend upon the prevailing set of conditions respecting resistance of organism and disposition of host, and the specific adjustment to optimum requirements can be easily ascertained by routine experiment.

Following is presented the general procedure in the pullorum experiments: 20 to 30 one-day-old New Hampshire chicks were inoculated orally with 0.2 cc. of a 24-hour tryptose broth culture of virulent *Salmonella pullorum*. Immediately following the inoculation the chicks were placed in a starting battery and given access to medicated feed ad libitum. The chicks were kept in the battery for a period of 28 days and daily observations were made. The chicks were removed and mortality figures calculated for the entire 28-day period. One pen in each experiment was used as a control. In this control pen, approximately the same number of chickens as in each of the medicated pens was used and treated in an identical manner except that no medication was given.

On observation, those chicks which were infected with pullorum disease showed characteristic symptoms, such as "pasting up behind," huddling together under the cover of the battery, a marked loss of appetite, an excessive growth of feathers in comparison with body size, and many died. A representative number of the chicks that died, both in control and in the medicated groups, were autopsied and cultures were made from the heat, lung, and liver in tetrathionate broth, followed by isolation on S. S. agar. Final identification was made by carbohydrate fermentation. In all experiments conducted, death was generally found to be attributable to pullorum disease and these findings were based upon the observations of the surviving controls, autopsy findings on the control birds, and the readiness with which the organism could be isolated from them.

With this procedure, the following tests were carried out in proof of the synergetic action between the compounds in accordance with my invention.

*Example I*

80 chickens were divided into 4 groups of 20 birds to a group and inoculated with *Salmonella pullorum*. One group served as control, and the three others were treated with medicated feed under the following conditions:

Group A received 4-4-diamino-diphenylsulfone in a concentration of 0.02%.

Group B received a mixture of 0.1% N'-phenyl-sulfanilamide and 0.02% 4-4-diamino-diphenylsulfone.

Group C received a mixture of 0.1% N'-phenyl-sulfanilamide and 0.01% 4-4-diamino-diphenylsulfone.

After the testing period of 28 days, a mortality rate of 43% was found in the control group while group A showed a mortality rate of 22%. By contrast, the mortality rate for groups B and C was only 4.3%.

Example II 300 chickens were divided into 12 groups, 25 birds to a group, and infected with *Salmonella pullorum* as described above. The results obtained with the medicated groups and controls are tabulated below:

| Group | Medication | Conc. in Feed | Mortality Rate |
|---|---|---|---|
| | | Per cent | Per cent |
| 1 | 4-4'diaminodiphenylsulfone | 0.05 | 97 |
| 2 | do | 0.01 | 76 |
| 3 | N'-benzoylsulfanilamide | 1.0 | 47 |
| 4 | do | 0.5 | 88 |
| 5 | do | 0.1 | 91 |
| 6 contr | Unmedicated | | 100 |
| 7 | N'-phenylsulfanilamide | 1.0 | 78 |
| 8 | do | 0.5 | 94 |
| 9 | do | 0.1 | 97 |
| 10 contr | Unmedicated | | 100 |
| 11 | N'-phenylsulfanilamide+4-4' diaminodiphenylsulfone | 0.1+0.01 resp. | 25 |
| 12 contr | Unmedicated | | 100 |

Example III 150 chickens were divided into 6 groups, 25 birds to the group, and infected and treated as in the foregoing examples. The results obtained are indicated in the following table:

| Group | Medication | Conc. in Feed | Mortality Rate |
|---|---|---|---|
| | | Per cent | Per cent |
| 1 | Sulfamerazine | 0.1 | 54 |
| 2 | 4-4' diaminodiphenylsulfone | 0.01 | 91 |
| 3 | Sulfamerazine+4-4' diphenyl sulfone. | 0.1+0.01 | 26 |
| 4 | N'-benzoylsulfanilamide+4-4' diaminodiphenylsulfone. | 0.1+0.01 | 17 |
| 5 | N'-benzoylsulfanilamide+4-4' diaminodiphenylsulfone+yeast. | 0.1+0.01+5 | 21 |
| 6 contr | Unmedicated | | 42 |

Example IV 100 chickens, divided into 4 groups of 25 each, were infected and treated as in the foregoing examples. The following results were obtained with various medications:

| Group | Medication | Conc. in Feed | Mortality Rate |
|---|---|---|---|
| | | Per cent | Per cent |
| 1 | 4-4'diaminodiphenylsulfone | 0.01 | 83 |
| 2 | N'-phenylsulfanilamide | 0.1 | 31 |
| 3 | N'-phenylsulfanilamide+4-4'diaminodiphenylsulfone. | 0.1+0.01 | 5.5 |
| 4 contr | Unmedicated | | 65 |

Example V 100 chickens, divided into 4 groups of 25 each, were infected and treated as described above. The following figures illustrate the synergistic action of 4-4'diamino-diphenylsulfone:

| Group | Medication | Conc. in Feed | Mortality Rate |
|---|---|---|---|
| | | Per cent | Per cent |
| 1 | 4-4'diaminodiphenylsulfone | 0.02 | 22 |
| 2 | N'-phenylsulfanilamide+diaminodiphenylsulfone. | 0.1+0.01 | 4.3 |
| 3 contr | Unmedicated | | 43 |

While the sulfa drugs and their synergistic agent may be directly incorporated into feed of any type, they are no less efficacious when added in form of a mixture with any suitable orally ingestible and non-toxic vehicle or carrier, such as medicinal agents and excipients, binders and similar materials. Diluents of desirable properties may include yeast, flour, starch, talc, clays, sulfur and similar pulverulant materials. A particularly successful medication is a combination with yeast of the following composition:

| | Per cent |
|---|---|
| Yeast | 76 |
| N'phenylsulfanilamide | 20 |
| 4-4'diaminodiphenylsulfone | 4 |
| | 100 |

0.5% of this composition were homogeneously mixed with poultry feed, corresponding to a ratio of 0.1% N'-phenylsulfanilamide and 0.02% of 4-4'diaminodiphenylsulfone. As in Example V mortality was reduced to 4.3%. Instead of N'-phenylsulfanilamide other equivalent sulfanilamide derivatives, such as N'-benzoylsulfanilamide, sulfamerazine and others may be used in this composition with like success. It will be understood, however, that on an equal ratio basis the above exemplified proportions of the sulfa drug and the 4.4'-diamino-diphenyl-sulfone may be varied within effective and practical limits, and that correspondingly higher or lower concentrations of the composite mixture may be added to the feed. The ratios between sulfa drug and the sulfone compound which so far have shown best results, are found within the range of approximately 5:1 to 10:1, but should not be considered as limitative for the purpose of this invention.

It is thus apparent that a most effective treatment has been discovered for combating Salmonella infections and especially pullorum disease in chickens. The above described tests strikingly demonstrate the synergetic potency of 4-4' diamino-diphenyl-sulfone in the sulfatherapeutic control of Enterobacteriaceae infections by enhancing the efficacy of the sulfa compounds themselves in various degrees depending on the specific sulfa derivative applied. Thus N'-benzoylsulfanilamide when medicated in a concentration of 1% still shows a mortality of 47% while only one-tenth of this dosage combined with 0.01% of 4-4'-diaminodiphenylsulfone reduces the death rate by approximately 50%. If 0.1% of the sulfa drug is used, its potency in combination with the synergistic action factor is enhanced by more than 70%. In the case of sulfamerazine the gain in efficacy is more than 50%, while it rises to 85% when N'-phenylsulfanilamide is administered. The synergetic reaction between 4-4' diaminodiphenylsulfone is not conditioned by any particular sulfanilamide compound such as shown in the various foregoing examples. It rather resides, and this is within the scope of the present invention, in the

grouping so that other sulfa derivatives carrying this structural element may also be used in conjunction with 4-4'diaminodiphenylsulfone and their homologues for the purpose in view. This is clearly predicated upon the accepted principle that all the sulfa drugs are generally acting through the same sulfanilamide mechanism. Their differences in potency and toxicity may partly depend upon their varying degree of adsorption in the bacteria, and partly upon their degree and speed of assimilation in the living organism.

As a further outstanding advantage it will be evident that substantially lower dosages of the sulfa compound may be employed when combined with the synergistic factor than when used alone. In view of the relatively high toxicity of the sulfa drugs in general this fact is of significance not only with respect to the possibility of an extended use in particularly sensitive cases, but also in connection with new fields of medication where sulfa compounds have hitherto been unavailable by reason of their damaging action on the system. Thus it becomes possible to apply synergistic sulfatherapeutic treatment even to young chicks where the administration of sulfa alone in efficacious concentrations would seriously endanger the life of the animals.

While the therapeutic combination is desirably administered in admixture with feed, there is no intent to be limited to this mode of medication. Thus the composition may be supplied in powder form in conjunction with other suitable, non-toxic vehicles, such as the above mentioned medicinal excipients and binders and other ingredients having or not having supplementary action. In this form the medicament may be pressed into tablets or it may be provided in form of an emulsion or suspension which may be incorporated into liquid or semi-liquid media in appropriate concentrations. It is furthermore not essential that one sulfa compound alone be used in combination with 4-4' diamino-diphenyl sulfone or its derivatves, but two or more sulfa derivatives with mutually enhancing potency may likewise be employed with most satisfactory results.

While the invention has been described in accordance with the preferred embodiments, it is apparent that many variations and modifications may be resorted to without departing from the scope of equivalents within the purview and spirit of this invention.

What I claim is:

1. A chemotherapeutic preparation for the control of *Salmonella pullorum* infections comprising substantially a mixture of a sulfanilamide derivative carrying the group

and the compound 4-4'diamino-diphenylsulfone.

2. A chemotherapeutic preparation for the control of *Salmonella pullorum* infections including a non-toxic, orally ingestible vehicle containing a mixture of a sulfanilamide derivative carrying the group

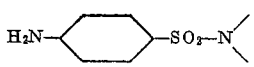

and the compound 4-4'diaminodiphenylsulfone.

3. A chemotherapeutic preparation for the control of *Salmonella pullorum* infections including a poultry feed containing substantially a mixture of a sulfanilamide derivative carrying the group

and the compound 4-4'diaminodiphenylsulfone.

4. A chemotherapeutic preparation for the control of *Salmonella pullorum* infections comprising substantially a mixture of N'-phenylsulfanilamide and the compound 4-4'-diaminodiphenylsulfone.

5. A chemotherapeutic preparation for the control of *Salmonella pullorum* infections comprising substantially a mixture of N'-benzoylsulfanilamide and the compound 4-4'-diaminodiphenylsulfone.

6. A chemotherapeutic composition for the control of *Salmonella pullorum* infections including a poultry feed containing substantially a mixture of N'-benzoyl-sulfanilamide and 4-4'-diaminodiphenylsulfone in a ratio of approximately between 5:1 and 10:1.

7. A chemotherapeutic preparation for the control of *Salmonella pullorum* infections comprising substantially a mixture of sulfamerazine and the compound 4-4'-diaminodiphenylsulfone.

8. A chemotherapeutic composition for the control of *Salmonella pullorum* infections including a non-toxic, orally ingestible vehicle containing substantially a mixture of sulfamerazine and the compound 4-4'-diaminodiphenylsulfone.

9. A chemotherapeutic composition for the control of *Salmonella pullorum* infections including a poultry feed containing substantially a mixture of sulfamerazine and the compound 4-4'-diaminodiphenylsulfone.

10. A chemotherapeutic composition for the control of *Salmonella pullorum* infections including a poultry feed containing substantially a mixture of sulfamerazine and 4-4'-diaminodiphenylsulfone in a ratio of approximately between 5:1 and 10:1.

11. A chemotherapeutic preparation for the control of *Salmonella pullorum* infections comprising substantially a mixture of yeast, a sulfanilamide derivative carrying the group

and the compound 4-4'-diaminodiphenylsulfone.

12. A chemotherapeutic composition for the control of *Salmonella pullorum* infections comprising substantially a mixture of yeast, a sulfanilamide derivative carrying the group

and 4-4'-diaminodiphenylsulfone, the ratio between the sulfa drug and the 4-4'-diaminodiphenylsulfone being approximately between 5:1 and 10:1.

OLIVER HERDIEN PETERSON.

REFERENCES CITED

The following references are of record in the file of this patent:

UNITED STATES PATENTS

| Number | Name | Date |
| --- | --- | --- |
| 2,358,365 | Tullar | Sept. 19, 1944 |

OTHER REFERENCES

Manufacturing Chemist, vol. 14, June 1943, page 160.

U. S. Dispensatory, 24th ed. (1947), pages 1612, 1762, 1763.